Patented Apr. 18, 1933                                          1,904,593

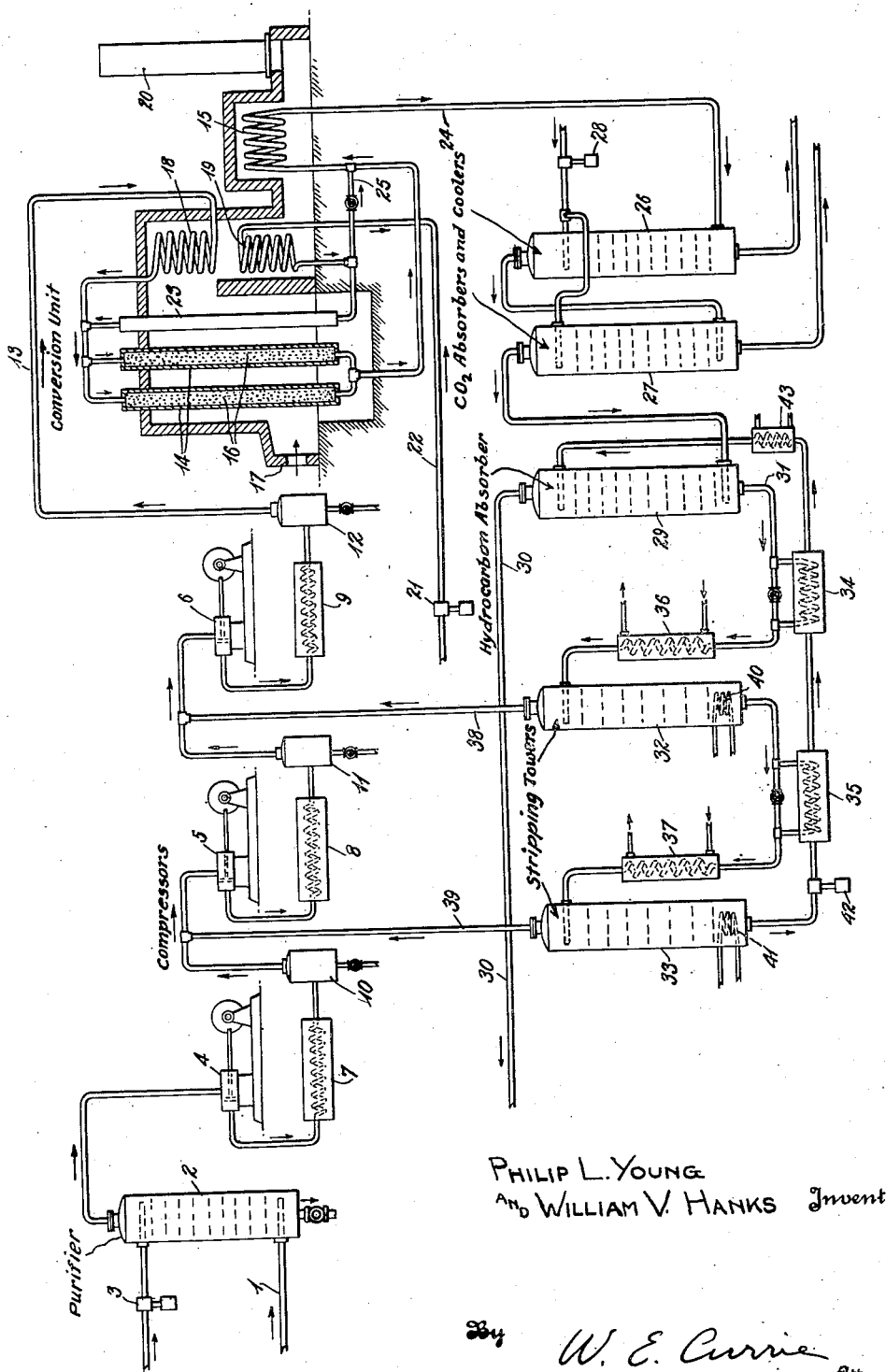

UNITED STATES PATENT OFFICE

PHILIP L. YOUNG, OF ELIZABETH, NEW JERSEY, AND WILLIAM V. HANKS, OF BATON ROUGE, LOUISIANA, ASSIGNORS TO STANDARD OIL DEVELOPMENT COMPANY

PROCESS FOR THE MANUFACTURE OF GAS RICH IN FREE HYDROGEN

Refiled for application Serial No. 389,742, filed August 31, 1929. This application filed September 17, 1932. Serial No. 633,693.

The present invention relates to the manufacture of gas rich in free hydrogen under high pressure and more specifically comprises an improved process for the manufacture of high pressure hydrogen or gases rich in the same from hydrocarbon materials. The process will be fully understood from the following description and the drawing which illustrates one form of apparatus constructed according to the invention.

The drawing is a semi-diagrammatic view in sectional elevation of an apparatus for carrying out the process and indicates the flow of materials.

In recent years it has become desirable to manufacture high pressure hydrogen in large volumes for the manufacture of ammonia and other uses. The present process comprises a relatively cheap method for producing large volumes of hydrogen, either in a relatively pure state or in admixture with other gases such as nitrogen or oxide of carbon, from hydrocarbons such as methane or liquid hydrocarbon or from mixtures such as natural, refinery or highly cracked gases. The present process is adapted to the manufacture of hydrogen for use at pressure in excess of 10 or 20 or 50 or even 100 or 200 atmospheres and is an improvement over the method disclosed in Serial No. 389,340 filed August 30, 1929 in the names of P. L. Young, Wm. V. Hanks and G. H. Freyermuth, and this application is a substitute for U. S. Serial No. 389,742, filed Aug. 31, 1929.

Referring to the drawing reference character 1 denotes a line through which a gaseous hydrocarbon such as methane is supplied at relatively low pressure to a scrubbing tower 2 or other means in which catalytic poisons such as sulphur are removed. The tower may be supplied with an alkaline solution by pump 3 and the gas passes to a series of compressors, of which three only are shown, 4, 5 and 6 respectively. These may be separate stages of the same compressor if desired as will be understood. Compressed gas from each compressor is cooled in coolers 7, 8 and 9 and condensate may be separated in traps 10, 11 and 12 respectively. The compressed gas then flows to the conversion unit by line 13.

The conversion units comprise two stages represented by pipes 14 and 15 respectively. Pipes 14 are preferably upright and are filled with a suitable catalytic material 16 the nature of which will be disclosed below. Pipes 14 may be heated in any suitable manner such as by means of direct heat from combustion gases in a furnace setting 17 and waste heat gases after flowing over preheating coils 18 and 19, passes around pipes 15 which make up the second stage of the conversion unit, and then passes to the stack 20.

The compressed gas first flows through the preheating coil 18 and then through pipes 14. Water is forced by pump 21 through line 22 to preheating and vaporizing coil 19 and a part then passes through superheater tube 23 which may be mounted along with pipes 14. Superheated steam is then admitted to pipes 14 in admixture with the hydrocarbon gas. In passing through catalyst pipes 14 a substantial part of the hydrocarbon is converted to hydrogen and carbon monoxide or dioxide and the mixture flows to pipes 15 by means of line 24. Additional steam may be added by line 25 from coil 19. Pipes 15 are also filled with a suitable catalyst for conversion of one oxide of carbon to another, for example carbon monoxide to carbon dioxide through the reaction with steam.

The gas mixture now comprising hyrogen, an oxide of carbon and unconverted methane passes to two towers 26 and 27 which are fed with high pressure water from pump 28 so that the gas mixture is quickly cooled and carbon dioxide is removed in solution of the outgoing water. An alkaline solution may be fed to the second tower in place of water, if desired. The gas, substantially free of carbon dioxide then flows to an oil scrubbing tower 29 or a series of such towers which are operated under high pressure, so that substantially all of the unconverted gaseous hydrocarbon is dissolved. The purified gas flows by line 30 under high pressure to its point of use. The oil charged with gaseous hydrocarbons then passes by line 31 to a series of flash towers of which only two 32 and 33 are shown. The oil is passed through exchangers 34 and 35 and preheaters 36 and 37 respectively before discharge into the different towers of the series and pressure is reduced in stages from one tower to the next so that gas is released at different pressures. The released gas flows to the series of compressors 5 and 6 by lines 38 and 39 respectively. The bases of the towers may be heated by coils 40 and 41 and a small quantity of high pressure hydrogen may be added to the base of the towers, if desired. The oil from the base of each tower flows to the top of the next succeeding tower as will be understood and the final oil, substantially free of hydrocarbon gas is pumped by pump 42 through exchangers 34 and 35, cooler 43 and back to the top of tower 29 for reuse.

In the operation of the high pressure conversion process it has been found desirable to operate at pressures in considerable excess of atmospheric pressure, for example 10 or 20 or even 50 and 100 atmospheres or higher and it has been further found that under such pressure it is only possible to obtain complete conversion at high temperatures. But there are few commercial materials of construction which can stand the severe conditions, for example pressures over 50 or 100 atmospheres and temperatures over 1500° F. which would be necessary for substantially complete conversions. The higher the pressure, the higher is the necessary temperature for the same conversion, although excessive quantities of steam may be used to increase conversion. At all events it has been found to be more satisfactory to limit temperature to 1300° F. or 1500° F. at the most and at this temperature the conversion at 200 atmospheres is found to be about 50% of the entering methane when an active catalyst is used. Temperatures above 1000° F. are desirable although they may be lower with a smaller conversion as a result. Steam should be in excess of the theoretical quantity requisite to convert the carbon of the hydrocarbon to carbon dioxide and it may be satisfactorily from two to ten times the theoretical quantity or more. The catlyst used is ordinarily a mixture of nickel or cobalt oxides with alumina or thoria but the nickel and cobalt may be used alone or with other oxides as will be understood, such as other rare earths either in substantial proportions or as promoters.

The catalysts may be in lump form or may be spread or precipitated on pumice or other support and packed into tubes 14, which are preferably of a nickel or chromium alloy steel capable of withstanding temperature and pressure. The tubes may be heated externally as shown or internally by electricity, as will be understood or by combustion of part of the gas by addition of air, in case a mixture of hydrogen and nitrogen is desired, or oxygen, in case pure hydrogen or hydrogen and carbon monoxide is desired.

The second stage of the conversion is for formation of CO to $CO_2$ and may be omitted if CO is desired in the final gas mixture. On the other hand, if pure hydrogen is desired, the gas is passed through tubes 15 at full pressure and at a temperature under about 1000° F. and preferably as low as 750° F. Even lower temperatures of about 650° F. to 550° F. or lower may be used with suitably active catalyst. The catalyst used is preferably iron oxide or a mixture containing the same.

The carbon dioxide may be dissolved from the gas mixture with water and the gas which then contains a substantial proportion of methane or other gaseous hydrocarbon is scrubbed at full pressure or even at a higher pressure, if desired, with oil by means of which the percentage of hydrocarbon may be decreased to less than 5 or even 1% of the residual gas which may be further compressed, if desired.

The residual gas is then removed and the oil charged with hydrocarbon gas is flashed at successively lower pressures, which may correspond to the compression stages of the original gas fed and the released gas may be recirculated to the various compressors or stages without further drop in pressure. The pressure on the charged oil may be released substantially to atmospheric in one stage, if desired. Such operation will be found preferable when the hydrocarbon conversion is conducted at pressure of 10 to 20 atmospheres. It is desirable to heat the oil to be flashed to assist in the removal of the gas as will be understood.

This invention is not to be limited by any theory of the mechanism of the process nor by any method of carrying out the process which may have been described for illustrative purposes but only by the following claims in which it is desired to claim all novelty inherent in the invention.

We claim:

1. An improved process for the production of gas rich in free hydrogen under high pressure, comprising passing a gaseous hydrocarbon through a catalytic zone admixed with steam at temperature in excess of about 1000° F. and at pressure in excess of atmospheric pressure, scrubbing the gas with oil under pressure, removing the hydrogen, then removing the oil and releasing pressure thereon, whereby the absorbed gas is liberated, and returning the absorbed gas to the catalytic zone.

2. Process in accordance with claim 1 in which the gaseous hydrocarbon is compressed in a series of compression stages, the hydrocarbon gas dissolved under pressure in oil is released in a corresponding series of stages and gas liberated in each of such reduction stages is returned to the corresponding compression stage.

3. Process according to claim 1 in which carbon dioxide is removed from the converted mixture prior to scrubbing with oil to remove gaseous hydrocarbon.

4. Process according to claim 1 in which the pressure is in excess of 10 atmospheres in the conversion stage.

5. Process in accordance with claim 1 in which the pressure in the conversion stage is in excess of 50 atmospheres.

6. Process in accordance with claim 1 in which the pressure in the conversion stage is in excess of 100 atmospheres.

7. Process according to claim 1 in which the oil is heated to assist in liberation of dissolved gas.

8. An improved process for production of high pressure gas rich in free hydrogen, comprising compressing a gaseous hydrocarbon in a series of compression stages, passing the compressed gas through a suitable catalytic zone with steam in excess of that sufficient theoretically to convert the carbon to carbon dioxide, while maintained at a temperature in excess of 1000° F., passing the gas so produced over a suitable catalyst at a temperature below 1000° F. whereby carbon monoxide is converted into carbon dioxide, substantially removing the latter constituent, dissolving unconverted gaseous hydrocarbon in a suitable solvent under full pressure, removing undissolved gas, releasing pressure on the solvent in a series of stages and returning the gas so liberated to the compression stages.

9. Process according to claim 8 in which the pressures of pressure release stages are regulated so as to correspond to the various compression stages and gas released in each reduction stage is fed back to the corresponding compression stage.

10. Process according to claim 8 in which the temperature in the first conversion stage is between about 1000 to 1500° F.

11. Process according to claim 1 in which the gas is substantially freed of sulphur and other catalyst poisons, prior to passage through the catalytic zone.

12. Process according to claim 1 in which the temperature of the catalytic zone is between 750 and 1500° F.

13. Process according to claim 1 in which the gas from the conversion stage is compressed to a higher pressure before being scrubbed with oil.

14. Process according to claim 1 in which gases containing free oxygen are admitted to the catalytic zone.

15. Process according to claim 1 in which the gaseous hydrocarbon is methane.

16. Process according to claim 8 in which additional steam is added before the second catalytic zone.

PHILIP L. YOUNG.
WILLIAM V. HANKS.